US011836410B2

(12) United States Patent
Killian et al.

(10) Patent No.: US 11,836,410 B2
(45) Date of Patent: Dec. 5, 2023

(54) INTERACTIVE HEADGEAR

(71) Applicant: Universal City Studios LLC, Universal City, CA (US)

(72) Inventors: Alyssa Dalys Killian, Orlando, FL (US); Dante Lamar Bruno, Orlando, FL (US); Megan Elizabeth Robinson, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 135 days.

(21) Appl. No.: 16/654,633

(22) Filed: Oct. 16, 2019

(65) Prior Publication Data

US 2021/0042080 A1 Feb. 11, 2021

Related U.S. Application Data

(60) Provisional application No. 62/883,458, filed on Aug. 6, 2019.

(51) Int. Cl.
*G06F 3/14* (2006.01)
*G05B 19/042* (2006.01)
(Continued)

(52) U.S. Cl.
CPC ............ *G06F 3/1423* (2013.01); *A42B 3/306* (2013.01); *G01P 1/06* (2013.01); *G05B 19/042* (2013.01);
(Continued)

(58) Field of Classification Search
None
See application file for complete search history.

(56) References Cited

U.S. PATENT DOCUMENTS 5,774,096 A * 6/1998 Usuki ................. G02B 27/017
340/980
9,846,308 B2 12/2017 Osterhout
(Continued)

FOREIGN PATENT DOCUMENTS

DE 102014215322 A 2/2016
KR 20110093683 A 8/2011
(Continued)

OTHER PUBLICATIONS

Chatham, et al., "LumaHelm", http://portfolio.walmink.com/lumahelm.php, 2012, last accessed Sep. 19, 2019.
(Continued)

*Primary Examiner* — Charles E Anya
(74) *Attorney, Agent, or Firm* — Fletcher Yoder, P.C.

(57) ABSTRACT

Headgear includes one or more sensors that provide input information to a controller of the headgear. The sensors may include accelerometers, location sensors, wireless receivers, cameras, and so on. The controller may receive the input information that is indicative of an orientation of the headgear, a location of the headgear, a communication signal, and/or an image or video. The headgear may also include one or more output devices that may be controlled by the controller (e.g., actuators, electronic displays, lights, speakers, and/or communication interfaces). As such, the headgear may output instructions to actuate an actuator, display an image on an electronic display, activate a light, emit a sound using a speaker, and/or send a communication signal using a communication interface. In particular, the headgear may determine an instruction to send to an output device in response to receiving the input information, and send the instruction to the output device.

20 Claims, 8 Drawing Sheets

(51) Int. Cl.
*A42B 3/30* (2006.01)
*G01P 1/00* (2006.01)
*G06F 1/16* (2006.01)

(52) U.S. Cl.
CPC .... *G06F 1/163* (2013.01); *G05B 2219/25317* (2013.01)

(56) References Cited

U.S. PATENT DOCUMENTS

| | | | |
|---|---|---|---|
| 11,036,055 B2 | 6/2021 | Ninan et al. | |
| 2011/0109619 A1* | 5/2011 | Yoo | H04N 21/4223 345/419 |
| 2012/0244801 A1* | 9/2012 | Lau | H04B 5/0006 455/41.1 |
| 2013/0278631 A1* | 10/2013 | Border | G02C 5/143 345/633 |
| 2017/0262054 A1* | 9/2017 | Lanman | G02B 27/0172 |
| 2019/0043448 A1* | 2/2019 | Thakur | G02B 27/017 |
| 2019/0044549 A1* | 2/2019 | Pillai | H04W 4/70 |
| 2019/0101959 A1 | 4/2019 | Fukuma et al. | |
| 2019/0163271 A1* | 5/2019 | Heubel | A63F 13/285 |
| 2019/0243448 A1* | 8/2019 | Miller | A61B 3/111 |
| 2019/0278090 A1* | 9/2019 | Yehezkel | G06F 3/017 |
| 2019/0302460 A1* | 10/2019 | Kaul | A61B 5/7445 |
| 2019/0359258 A1* | 11/2019 | Muenster | B62D 15/0285 |
| 2020/0093200 A1* | 3/2020 | Mohapatra | A42B 3/042 |
| 2020/0197758 A9* | 6/2020 | Schillings | A63B 71/0622 |

FOREIGN PATENT DOCUMENTS

| | | |
|---|---|---|
| WO | 2017153333 A1 | 9/2017 |
| WO | 2018167625 A1 | 9/2018 |

OTHER PUBLICATIONS

Machangpa, et al., "Head Gesture Controlled Wheelchair for Quadriplegic Patients", ICCIDS 2018, Elsevier Ltd.

GlassOuse V1.2 Assistive Mouse, EnnoPro Group Limited, https://www.robotshop.com/en/glassouse-v12-assistive-mouse.html?gclid=EAlalQobChMI64WxsaD74glVD0sNCh3RlgrwEAQYAyABEgl8cPD_BWE, last accessed Sep. 19, 2019.

Prajeshaasir, "helmet for blind (HALO)-haptic assitted locating of obstracle", Instructables.com, https://www.instructables.com/id/Helmet-for-BlindHALO-haptic-Assitted-Locating-of-O/, Mar. 21, 2016.

Razer Nari Ultimate, Razer, https://www.razer.com/gaming-audio/razer-nari-ultimate?utm_source=google&utm_medium=search-brand&utm_campaign=190508_RS_TXN_BTM_US_EGR-hari_TR&gclid=EAlalQobChMIxdzVj5X74gIVQ_7jBx1VYAUWEAAYASAAEgJ7p_D_BWE, last accessed Sep. 19, 2019.

Bhaptics, VR Tactsuit, https://www.bhaptics.com/, last accessed Sep. 19, 2019.

Stern, "Haptic Headband", adafruit learning system, Asafruit Industries, https://learn.adafruit.com/haptic-headband, Aug. 22, 2018.

PCT/US2020/044785 Invitation to Pay Additional Fees Nov. 4, 2020.

* cited by examiner

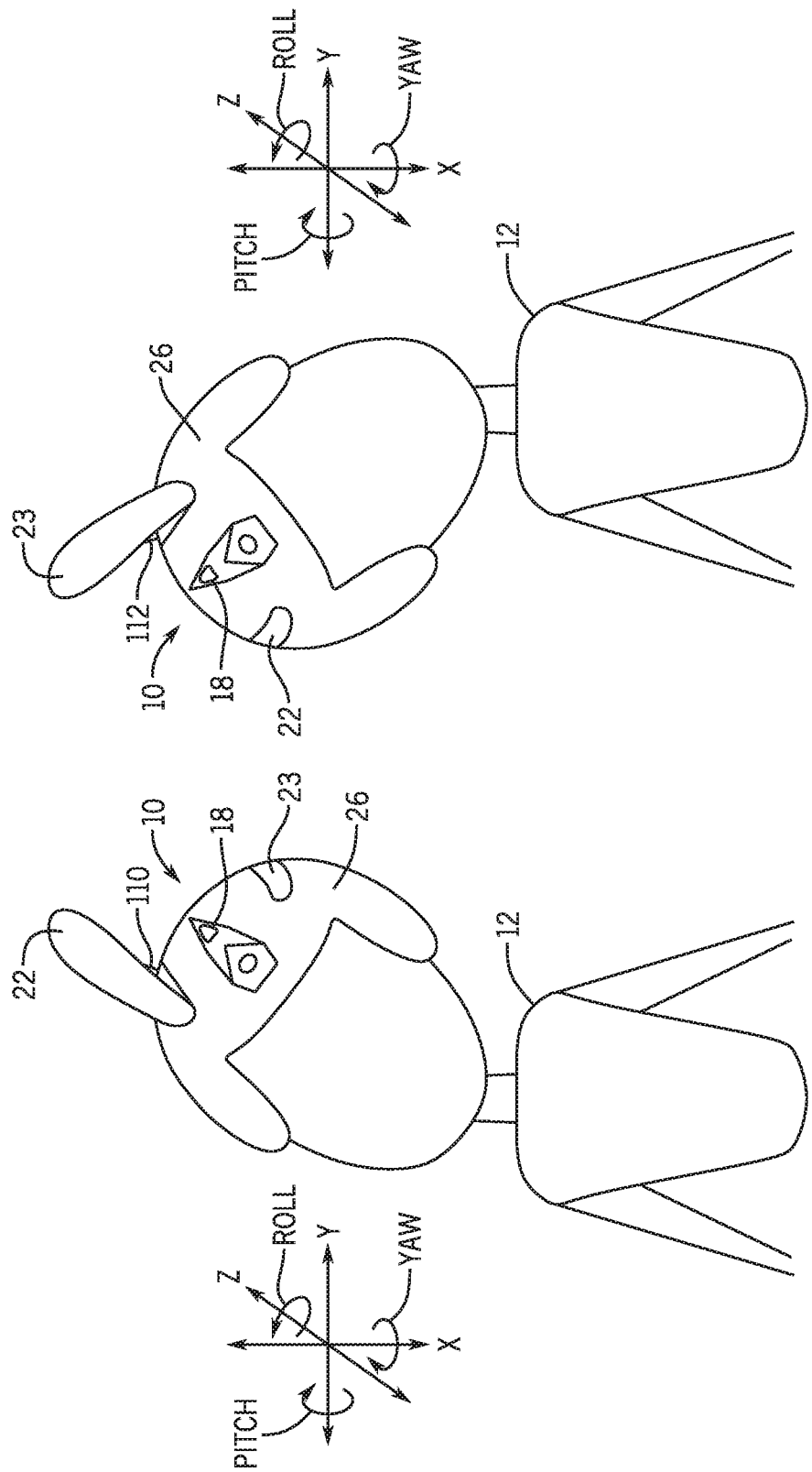

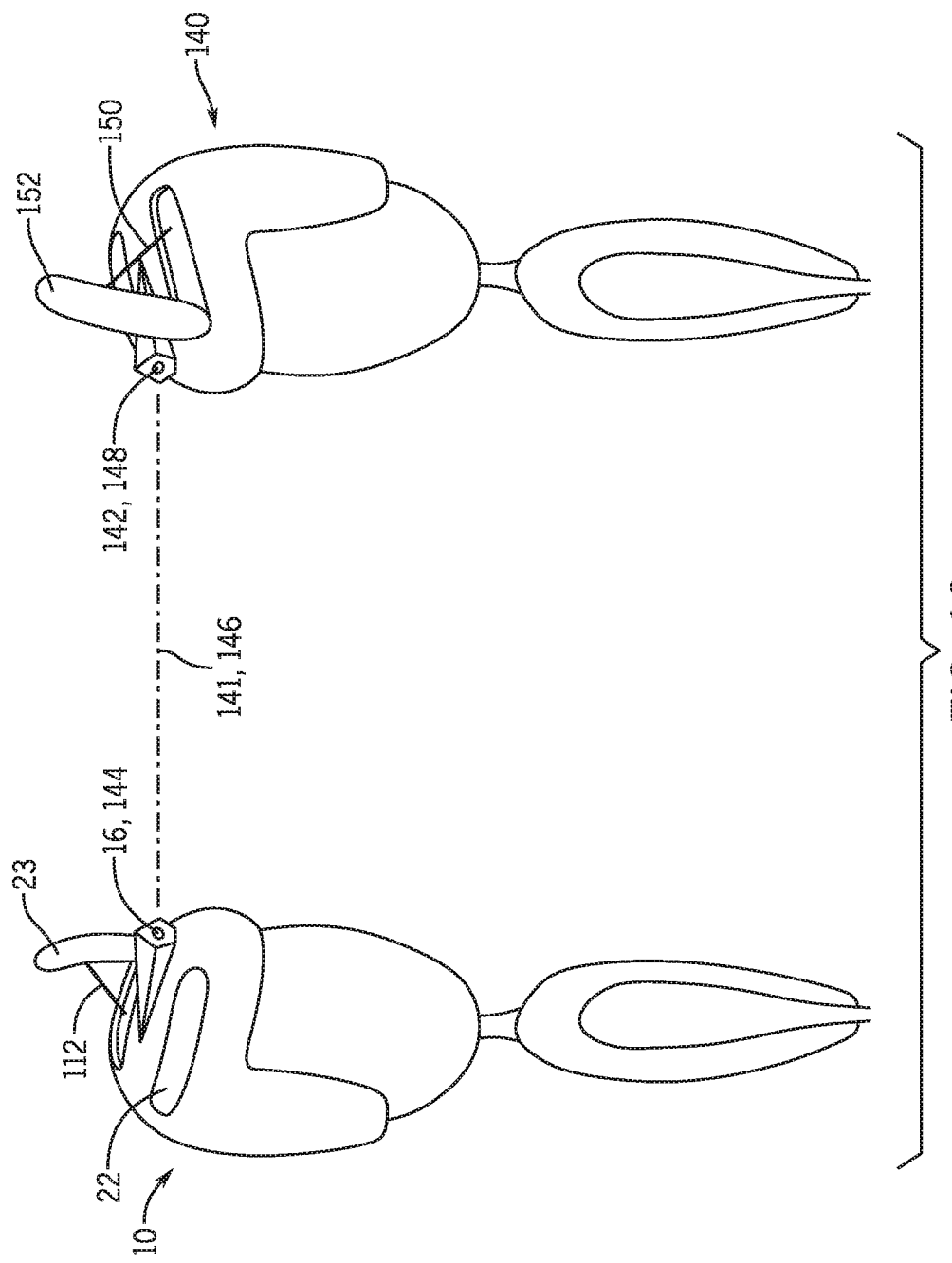

INTERACTIVE HEADGEAR

CROSS REFERENCE TO RELATED APPLICATIONS

This application claims the benefit of U.S. Provisional Application Ser. No. 62/883,458, entitled "Interactive Headgear," filed Aug. 6, 2019, which is hereby incorporated by reference in its entirety for all purposes.

BACKGROUND

Certain articles of clothing may be worn or associated with entertainment purposes, such as hats or headbands with decorative elements, shirts featuring famous movie characters, and so on. It is now recognized that more interactive features may be incorporated in such articles of clothing.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a headgear operation system includes an accelerometer coupled to headgear that detects an orientation of a headgear. The headgear operation system also includes an actuator coupling an extending portion of the headgear to a main body of the headgear. The actuator extends the extending portion away from the main body of the headgear and retracts the extending portion toward the main body of the headgear. The headgear operation system further includes a controller communicatively coupled to the accelerometer and the actuator. The controller has a processor and a memory. The memory stores machine-readable instructions that cause the processor to receive an indication of the orientation of the headgear from the accelerometer. The machine-readable instructions also cause the processor to determine an instruction to send to the actuator based on the indication of the orientation of the headgear. The instruction causes the actuator to extend the extending portion away from the main body of the headgear and retract the extending portion toward the main body of the headgear. The machine-readable instructions further cause the processor to send the instruction to the actuator.

In another embodiment, a headgear operation system has an accelerometer coupled to a headgear that detects an orientation of the headgear. The headgear operation system also has electronic displays coupled to the headgear. The electronic displays display eyes and mimic eye movement. The headgear operation system further has a controller communicatively coupled to the accelerometer and the electronic displays. The controller includes a processor and a memory. The memory stores machine-readable instructions that cause the processor to receive an indication of the orientation of the headgear from the accelerometer. The machine-readable instructions also cause the processor to determine an instruction to send to the electronic displays to adjust display of the eyes based on the indication of the orientation of the headgear. The machine-readable instructions further cause the processor to send the instruction to the electronic displays.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is a diagram of the headgear of FIG. 1 tilted to the left and a resulting output performed by actuators, according to embodiments of the present disclosure;

FIG. 6 is a diagram of the headgear of FIG. 1 tilted to the right and a resulting output performed by actuators, according to embodiments of the present disclosure;

FIG. 12 is a diagram of the headgear of FIG. 1 within the presence of another headgear and a resulting output performed by output devices, according to embodiments of the present disclosure;

DETAILED DESCRIPTION

Figure 2:
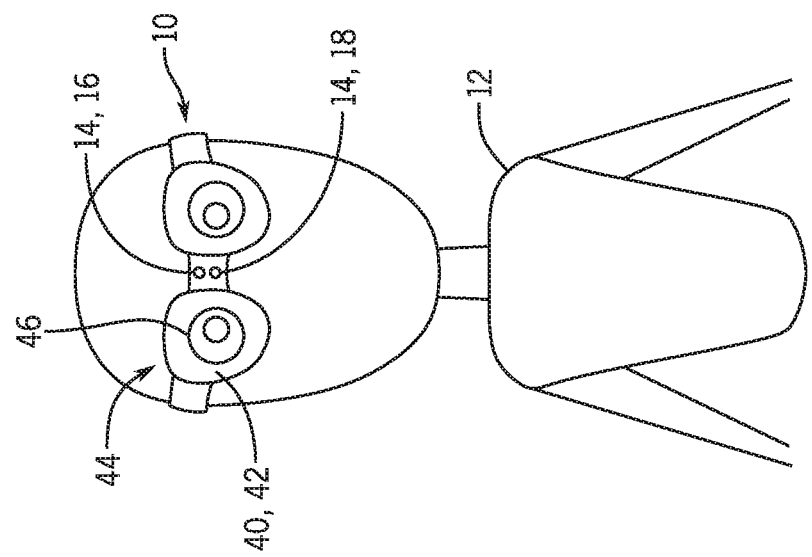
FIG. 2 is a diagram of an example of headgear in the form of glasses being worn by a user, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to interactive headgear and, more particularly, to headgear that receives a sensed input and performs an action based on the sensed input. As disclosed herein, "headgear" may include any article of clothing worn on the head of a person, such as a helmet, hat, headband, glasses, goggles, and so on. Moreover, while the disclosed embodiments discuss articles of clothing worn on the head of a person, any of the disclosed systems or methods may be applied to any other suitable article of clothing, such as shirts, vests, jackets, belts, pants, shorts, shoes, socks, gloves, scarves, and the like. Additionally, while the disclosed embodiments generally discuss headgear that is used for entertainment purposes, the disclosed embodiments may also apply to headgear that is used for any other suitable purpose, such as for safety, medical or health reasons, vision enhancement, to provide shade, and so on.

It is now recognized that interactive features may be incorporated in articles of clothing worn for entertainment purposes. For example, headgear may include one or more sensors that provide input information to a controller of the headgear, which uses the input to perform operations in accordance with present embodiments. The sensors may include accelerometers, location sensors (e.g., Global Positioning System (GPS) sensors), wireless sensors (e.g., sensors that operate using infrared, radio, proximity, satellite, microwave, WiFi, mobile communication, and/or Bluetooth technology), cameras, and so forth. As such, the controller may receive input information in the form of an orientation of the headgear, a location of the headgear, a communication signal, and/or an image or video. The headgear may also include one or more output devices that may be controlled by the controller (e.g., actuators, electronic displays, lights, speakers, and/or communication interfaces). As such, the headgear may output instructions to actuate an actuator, display an image on an electronic display, activate a light, emit a sound using a speaker, and/or send a communication signal using a communication interface. In particular, the headgear may determine an instruction to send to an output device in response to receiving the input information, and send the instruction to the output device. In other embodiments, other wearable articles (e.g., a vest or shoes with wings configured to actuate) may be employed instead of headgear.

For example, the headgear may include left and right decorative extensions (e.g., plastic ears that are made to resemble rabbit ears or rubber extensions made to resemble octopus tentacles) which are initially in a flattened orientation along the headgear. A user may wear the headgear, and tilt his or her head to the left. The tilt may be detected by an accelerometer mounted on the headgear, and information associated with the tilt (e.g., amount of yaw, pitch, and/or roll) may be sent to the controller. The controller may receive the information associated with the tilt, determine that an actuator that couples the right decorative plastic ear to the headgear should be actuated based on the tilt of the user's head, and send an instruction to the actuator to raise the right decorative plastic ear. In some embodiments, a degree of detected motion may determine different levels of actuation.

Figure 1:
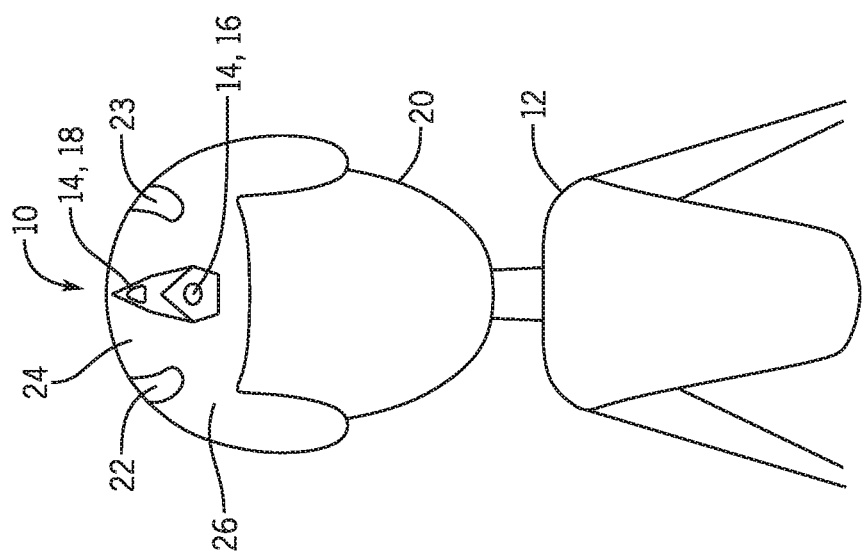
FIG. 1 is a diagram of an example of headgear in the form of a helmet being worn by a user, according to an embodiment of the present disclosure.

As an introduction, FIG. 1 is a diagram of an example of headgear 10 in the form of a helmet being worn by a user 12, according to an embodiment of the present disclosure. The headgear 10 may include one or more sensors 14. In particular, the headgear 10 is illustrated as having a wireless receiver or sensor 16 (e.g., a proximity or infrared sensor). The wireless receiver 16 may receive information or signals over a communication network using a wireless communication protocol or technology, such as radio, Bluetooth, WiFi, infrared, Ethernet, Thread, ZigBee, Z-Wave, KNX, mobile, and/or microwave. In particular, the wireless receiver 16 may receive a signal from a wireless transmitter of another headgear worn by another user over the communication network using the wireless communication protocol or technology, indicating that there is another headgear in proximity to the wireless receiver 16. In some embodiments, the wireless receiver 16 may receive proximity information (e.g., describing a distance to the other headgear) from the wireless transmitter of the other headgear. Moreover, the wireless receiver 16 may receive a signal from any other suitable communication device, such as a smartphone, a wearable device, a tablet, a personal computer, a laptop, and/or any other computing device. The wireless receiver 16 may also or alternatively be a wireless transceiver that may both receive and transmit signals.

The headgear 10 is also illustrated as having one or more motion sensors, such as a magnetometer, an accelerometer 18, and/or a gyroscope. The accelerometer 18 may detect an orientation or position of the headgear 10 caused by movement of the user's head 20. In particular, the accelerometer 18 may be mounted to the headgear 10 and detect a pitch, yaw, and/or roll of the headgear 10.

The headgear 10 may include a controller that receives the sensed information from the wireless receiver 16 and/or the accelerometer 18, and outputs an instruction to an output device based on the sensed information. As illustrated, the headgear includes what may be referred to as extending portions or actuatable features 22, 23. In the illustrated embodiment of FIG. 1, these actuatable features specifically include decorative rabbit ears 22, 23 that are in a flattened orientation (e.g., along and/or flush with a top surface 24 of the headgear 10). The ears 22, 23 may be coupled to a main body 26 of the headgear 10 via actuators, which may raise and lower the ears 22, 23 (e.g., toward and away from the main body 26) based on the sensed information. It should be understood that the ears 22, 23 are an example, and any suitable device or feature that may be actuated to and from the main body 26 of the headgear 10 is contemplated. For example, in one embodiment, a feature made to resemble an elephant trunk could be actuated in a manner similar to the ears 22, 23. As another example, false eyes on head band may be configured to actuate in a manner similar to the ears 22, 23.

Similarly, FIG. 2 is a diagram of an example of headgear 10 in the form of glasses being worn by a user 12, according to an embodiment of the present disclosure. The headgear 10 is illustrated as also including the sensors 14 in the form of the wireless receiver 16 and the accelerometer 18. The headgear 10 includes output devices 40 in the form of electronic displays 42. In particular, each lens 44 of the headgear 10 may be transparent or semi-transparent to the user 12 wearing the headgear 10 and enable the user 12 to see through the lens 44, but may cause people around or in front of the user to see what is displayed on the electronic displays 42. The displays 42 may include any suitable display technology, including electroluminescent (ELD) displays, liquid crystal (LCD) displays, light-emitting diode (LED) displays, organic LED (OLED) displays, active-matrix OLED displays, plasma display panels (PDP), quantum dot LED (QLED) displays, and so on.

In this case, the controller of the headgear 10 receives the sensed information from the wireless receiver 16 and/or the accelerometer 18, and outputs an instruction to the electronic displays 42 to display images of eyes 46 and mimic eye movement. For example, based on sensed movement of the headgear 10 (indicative of movement of the user's head 20), the controller may change the images of the eyes 46, to indicate different directions of the user's gaze, different moods (e.g., happy, sad, mad, pensive, tired, and/or excited), and so on. In some embodiments, the sensed information may be provided by, for example, an inward-facing camera that captures or senses the gaze, pupils, irises, lenses, and so on, of the user's eyes, and the controller of the headgear 10 may display and adjust display of the images of the eyes 46 based on the captured images from the inward-facing camera. It should be understood that the eyes 46 are an example, and any suitable image or video that may be displayed on the electronic displays 42 is contemplated. Moreover, in some embodiments, the headgear 10 may include both the helmet being worn by the user 12 in FIG. 1 in combination with the glasses being worn by the user 12 in FIG. 2.

Figure 3:
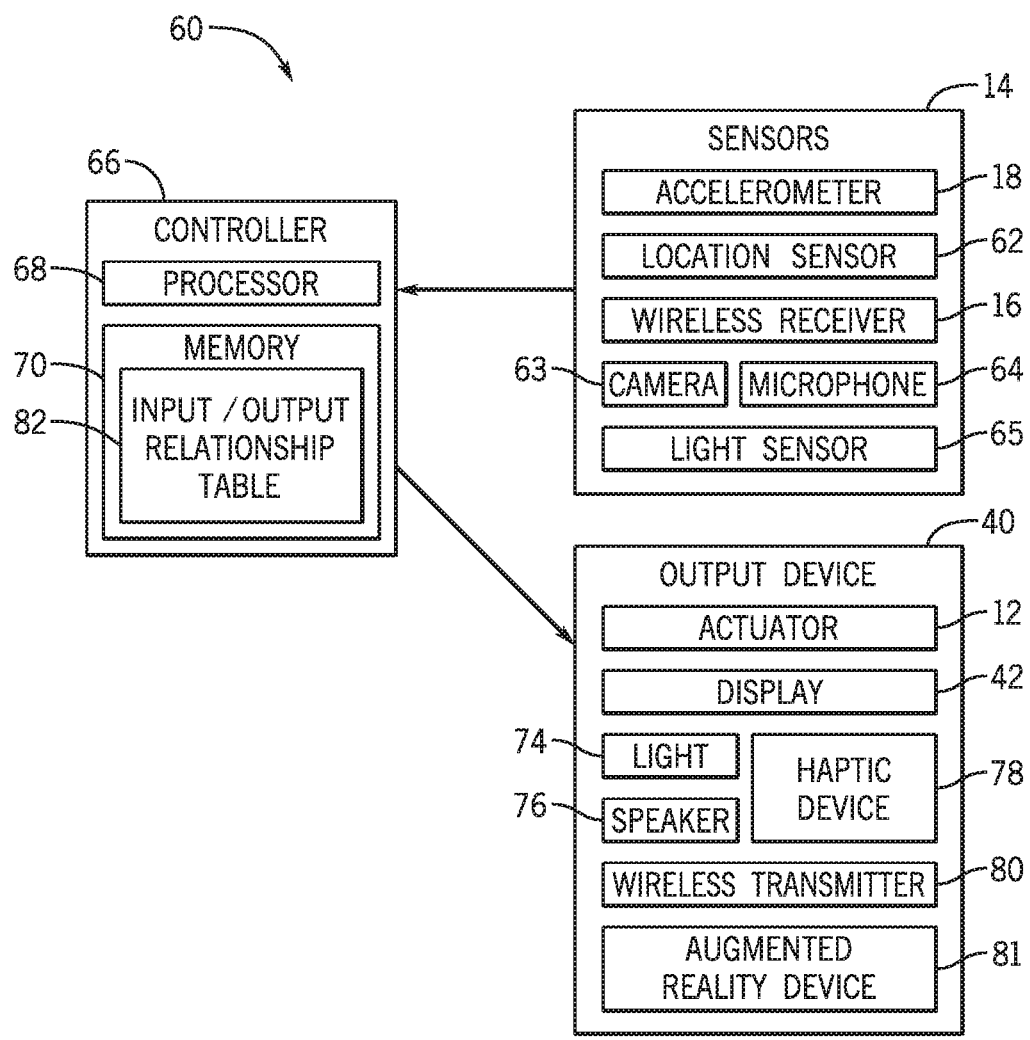
FIG. 3 is a block diagram of a headgear operation system, according to embodiments of the present disclosure.

With this in mind, FIG. 3 is a block diagram of a headgear operation system 60, according to embodiments of the present disclosure. Portions of the headgear operation system 60 may be disposed in or on headgear 10. As illustrated, the headgear operation system 60 may include one or more sensors 14. The sensors 14 may include the accelerometer 18, the wireless receiver 16, a location sensor 62, a camera 63, a microphone 64, and/or a light sensor 65. The location sensor 62 may be any suitable sensor that determines a location of the headgear 10. For example, the location sensor 62 may send and receive signals to and from GPS satellites and determine the location of the headgear 10 based on the signals (e.g., via triangulation or other location determining techniques). The camera 63 may include any suitable device that captures images and/or videos. The microphone 64 may include any suitable device that captures sound or audio data. The light sensor 65 may include any suitable device that detects light and/or determines a brightness level. Moreover, the sensors 14 may include any suitable sensing device for which an output may be generated, such as a heart rate monitor, pulse sensor, eye movement sensor, motion sensor, facial recognition sensor, and so on.

The sensors 14 may be communicatively coupled to a controller 66 having one or more processors (illustrated as a single processor 68) and one or more memory or storage devices (illustrated as a single memory device 70). The processor 68 may execute software programs and/or instructions stored in the memory device 70 that facilitate determining an instruction to send to an output device based on receiving sensed input from the sensors 14. Moreover, the processor 68 may include multiple microprocessors, one or more "general-purpose" microprocessors, one or more special-purpose microprocessors, and/or one or more application specific integrated circuits (ASICS). For example, the processor 68 may include one or more reduced instruction set (RISC) processors. The memory device 70 may store information such as control software, look up tables, configuration data, and so forth. The memory device 70 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 70 may store a variety of information and may be used for various purposes, such as instructions that facilitate determining an instruction to send to an output device based on receiving sensed input.

The controller 66 may also be communicatively coupled to one or more output devices 40, which may include actuators 72, the electronic displays 42, lights 74, speakers 76, haptic devices 78, a wireless transmitter 80, and/or an augmented reality device 81. In particular, the output devices 40 may be coupled to the headgear 10 and generate an output based on receiving an instruction or signal sent by the controller 66. For example, one or more actuators 72 may be output devices 40 coupled to the main body 26 of the headgear 10 and one or more extending portions of the headgear 10, such as the decorative rabbit ears 22, 23 shown in FIG. 1. The electronic displays 42 may also be output devices 40 that operate to display images or videos, such as the electronic displays 42 disposed in the lenses 44 of FIG. 2. Moreover, while the displays 42 shown in FIG. 2 are directed outward (e.g., away from the user 12), in some embodiments, the displays 42 may be directed inward (e.g., toward the user 12) such that the user 12 may view the images/videos displayed by the displays 42.

The lights 74 may include decorative lights disposed such that people looking at the user 12 may see the lights 74 turn on and off, though any suitable light-emitting device is contemplated. The speakers 76 may emit sounds such that people near the user 12 may hear the sounds, though any suitable audio output device is contemplated, including headphones or earphones that emit sounds directed at the user 12. The haptic devices 78 may include eccentric rotating mass actuators, linear resonant actuators, piezoelectric actuators, air vortex rings, ultrasound, or any other suitable haptic device, and cause the headgear 10 to move, vibrate, emit gusts of air, and so on. The wireless transmitter 80 may send information or signals over a communication network using a wireless communication protocol or technology, such as radio, Bluetooth, WiFi, infrared, Ethernet, Thread, ZigBee, Z-Wave, KNX, mobile, and/or microwave. The augmented reality device 81 may overlay virtual images onto and/or virtually enhance real-world objects or environments. The augmented reality device 81 may include glasses, goggles, smartphones, tablets, and/or any other suitable devices with cameras. Moreover, the output devices 40 may include any suitable device that generates an output in response to a sensed input, such as an augmentation device, an assistive device, a virtual reality device, and so forth.

The memory device 70 may store an input/output relationship table 82 or other relationship-defining data structure that maps sensed inputs to outputs. That is, the controller 66 of the headgear operation system 60 may receive input information or signals from one or more sensors 14, determine an output performed by an output device 40 that corresponds to the input information, and send an instruction to the output device 40 to perform the determined output.

Figure 4:
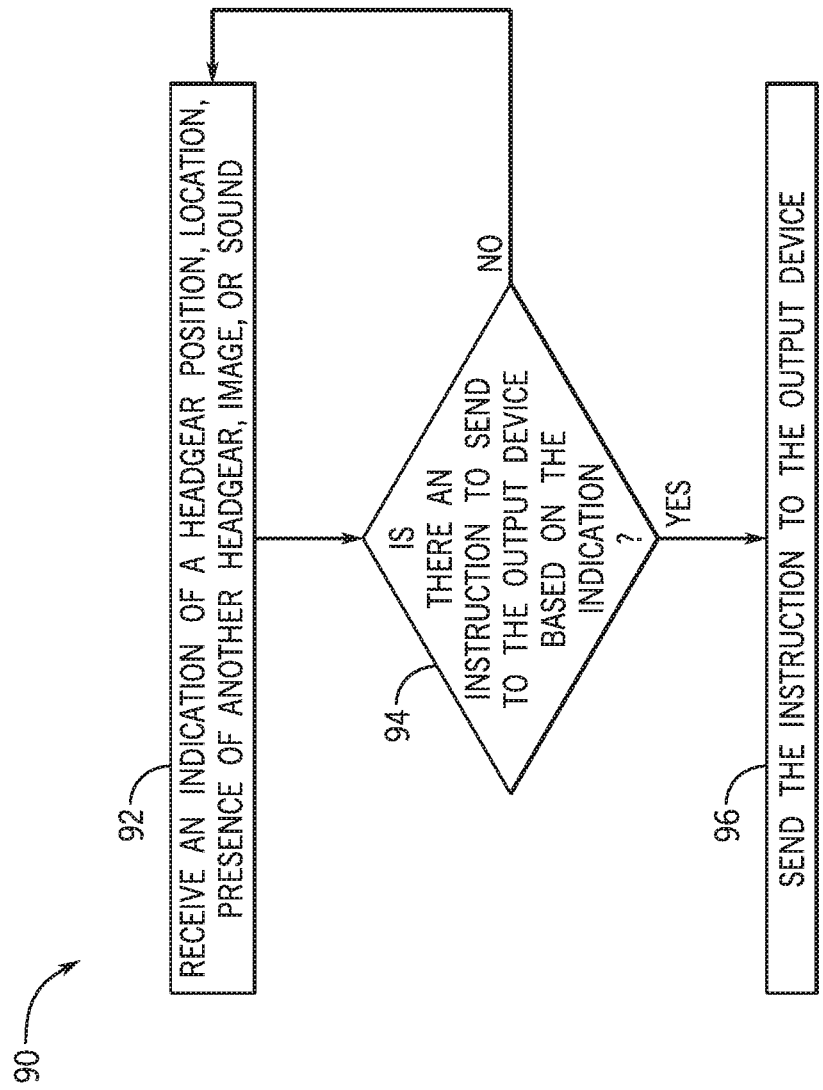
FIG. 4 is a flow diagram of a process for determining an instruction to send to an output device of the headgear based on receiving sensed input, according to embodiments of the present disclosure.

With this in mind, FIG. 4 is a flow diagram of a process 90 for determining an instruction to send to an output device 40 based on receiving sensed input, according to embodiments of the present disclosure. The process 90 may be performed by any suitable device that may determine an instruction to send to an output device 40 based on receiving sensed input, such as the processor 68. While the process 90 is described using steps in a specific sequence, it should be understood that the present disclosure contemplates that the described steps may be performed in different sequences than the sequence illustrated, and certain described steps may be skipped or not performed altogether. In some embodiments, the process 90 may be implemented by executing instructions stored in a tangible, non-transitory, computer-readable medium, such as the memory device 70, using a processor, such as the processor 68.

As illustrated, in process block 92, the processor 68 receives an indication of a headgear orientation or movement, location of the headgear 10, presence of another headgear, image, or sound. In particular, the processor 68 may receive the indication of headgear orientation or movement (e.g., pitch, yaw, and/or roll) from the accelerometer 18. The processor 68 may receive the indication of location of the headgear 10 from the location sensor 62. The processor 68 may additionally or alternatively receive the indication of another headgear worn by another user from the wireless receiver 16 (e.g., based on a signal sent from a wireless transmitter of the other headgear). The processor 68 may receive the indication of an image (e.g., an image of an expression on the user's face) from the camera 63. The processor 68 may receive the indication of a sound from the microphone 64. The processor 68 may receive the indication of a presence of light or a brightness level of light above a threshold brightness level from the light sensor 65.

In decision block 94, the processor 68 determines whether there is an instruction to send to an output device 40 based on the indication from process block 92. In particular, the processor 68 may query the input/output relationship table 82 or other relationship-defining data structure stored in the memory device 70 that maps indications to instructions to send to output devices 40. In some cases, there may not be an instruction to send to an output device 40 based on the indication. For example, the indication of the headgear orientation may indicate that the headgear 10 is level and/or has not moved. The processor 68 may query the table 82, which may not provide an instruction to be sent to an output device 40 of the headgear 10 (e.g., there is no entry in the table 82 corresponding to the headgear 10 being level and/or not moving). As such, the processor 68 may repeat the process 90 and return to process block 92 to receive an indication of a headgear orientation or movement, location of the headgear 10, presence of another headgear, image, or sound.

In other cases, the processor 68 may determine that there is an instruction to send to an output device 40 based on the indication. For example, the indication of the headgear orientation may indicate that the headgear 10 is tilted to the left. In particular, the indication of the headgear orientation may include a roll measurement provided by the accelerometer 18 that indicates that the headgear 10 is tilted to the left. The processor 68 may query the table 82, which may provide that an instruction of extension should be sent to a right actuator of the headgear 10 (e.g., an actuator that is coupled to a right decorative rabbit ear 22 of the headgear 10). Additionally or alternatively, the table 82 may provide that an instruction should be sent to the displays 42 to adjust the images of the eyes 46 (e.g., as a reaction to the tilt of the headgear 10 or a change in expression on the user's face, as provided by the camera 63).

As another example, the indication of the location of the headgear 10 may indicate that the headgear 10 is in a specific area (e.g., a room, a food court, a section of a theme park, an amphitheater, or a theme park attraction) that corresponds to a certain output as provided by the table 82. As such, the table 82 may provide an instruction that should be sent to the appropriate output device 40 to perform the certain output (e.g., causing the lights 74 to emit light in a certain pattern). As a specific example, an actuator attached to an extending portion resembling a nose may be activated to mimic a sniffing motion the indication of the location of the headgear 10 provides that the headgear 10 is positioned proximate a restaurant or food vendor.

As yet another example, the table 82 may provide an instruction that an appropriate output device 40 should display an image indicating recognition (e.g., via an outward-facing display 42) or alert the user 12 (e.g., by vibrating the headgear 10 using a haptic device 78) when the indication indicates the presence of another headgear, and/or that the other headgear is within a threshold proximity of the headgear 10. In such an example, the processor 68 may receive a proximity (e.g., distance) from the headgear 10 to the other headgear, and determine whether the proximity is within the threshold proximity (e.g., 1 inch to 500 feet, 6 inches to 100 feet, or 1 foot to 10 feet).

In some cases, the camera 63 may capture an image that corresponds to or triggers a certain output. For example, the image may include image recognition information, such as barcode or Quick Response (QR) code information, a character or cartoon, and/or text, such as that associated with a movie, television, or comic book. In some cases, the processor 68 may apply image recognition processes on the image to recognize the code information, character, and/or text. The table 82 may provide an instruction that an appropriate output device 40 should generate a sound (e.g., using the speaker 76) or an action (e.g., using the actuator 72) when the image corresponds to an entry in the table 82 (e.g., associated with the movie, television, or comic book).

Additionally or alternatively, the microphone 64 may capture a sound that corresponds to or triggers a certain output. For example, the sound may include keywords, vocalizations, sound effects, and/or music, associated with a movie, television, or comic book. In some cases, the processor 68 may apply audio recognition processes on the sound to recognize the keywords, vocalizations, sound effects, and/or music. The table 82 may provide an instruction that an appropriate output device 40 should display an image (e.g., via an outward-facing display 42 or the augmented reality device 81) or an action (e.g., using the actuator 72) when the sound corresponds to an entry in the table 82 (e.g., associated with the movie, television, or comic book). For example, in response to capturing the word "hello" (e.g., as vocalized by the user 12), a virtual character displayed by the augmented reality device 81 may react with its own greeting (e.g., waving).

As another example, the light sensor 65 may detect a presence of light or a brightness level of light above a threshold brightness level. For example, the brightness level of the light may correspond to that of being excessive, such that the light is uncomfortable for the user's eyes, or causes the user 12 to squint. The table 82 may provide an instruction that an appropriate output device 40 should shade the user's eyes (e.g., via a shading device that is actuated into a shading orientation using an actuator 72) when the brightness level of the light is above the threshold brightness level. Additionally or alternatively, the table 82 may provide an instruction that an appropriate output device 40 display an indication of the brightness of the light, such as an instruction to the electronic displays 42 to display squinting eyes when the brightness level of the light is above the threshold brightness level.

In process block 96, the processor 68 sends the instruction to the output device 40. For the example where the instruction is to extend the right actuator 72 in response to receiving the indication that the headgear 10 is tilted to the left, the processor 68 may send the instruction to the right actuator 72 to extend or actuate. When the instruction is to display an image (e.g., of a character of a movie) on the display 42 in response to receiving the indication that there is a presence of another headgear, the processor 68 may send the instruction to the display 42 to display the image. In this manner, the process 90 may determine an instruction to send to an output device 40 (e.g., the right actuator 72 or the display 42) based on receiving sensed input.

FIGS. 5-8 are diagrams of the headgear 10 in the form of a helmet tilted in different orientations and resulting outputs performed by actuators 110, 112, according to embodiments of the present disclosure. In particular, in FIG. 5, the user 12 tilts his or her head 20 to the left. As such, the accelerometer 18 detects a change in roll (e.g., about an axis parallel to the z-axis). The controller 66 may receive an indication of the change in roll or measurements indicating the change in roll, and determine that the right actuator 110 coupled to the right ear 22 should be actuated to extend the right ear 22 away from the main body 26 of the headgear 10 (as provided by the table 82). The controller 66 may then send an instruction to the right actuator 110 to actuate and extend the right ear 22.

In FIG. 6, the user 12 tilts his or her head 20 to the right. As such, the accelerometer 18 detects a change in roll (e.g., about an axis parallel to the z-axis). The controller 66 may receive an indication of the change in roll or measurements indicating the change in roll, and determine that the left actuator 112 coupled to the left ear 23 should be actuated to extend the left ear 23 away from the main body 26 of the headgear 10 (as provided by the table 82). The controller 66 may then send an instruction to the left actuator 112 to actuate and extend the left ear 23. In this case, the controller 66 may also determine that the right actuator 110 should be actuated to retract the right ear 22 toward the main body 26 of the headgear 10 (as provided by the table 82). As such, the controller 66 may also send an instruction to the right actuator 110 to actuate and retract the right ear 22.

Figure 8:
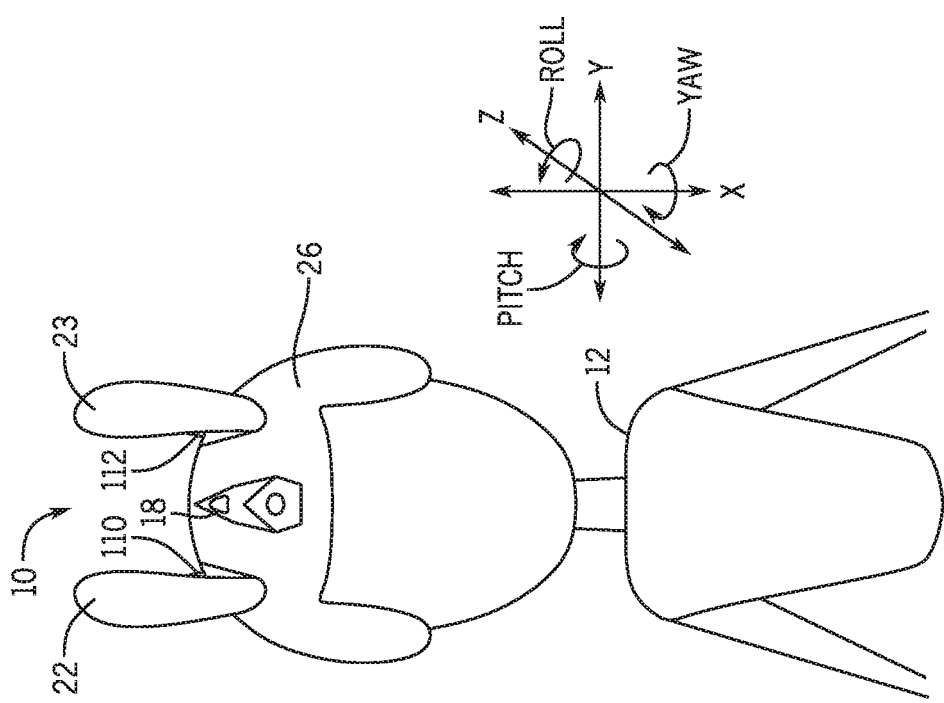
FIG. 8 is a diagram of the headgear of FIG. 1 tilted upward and a resulting output performed by actuators, according to embodiments of the present disclosure.
Figure 7:
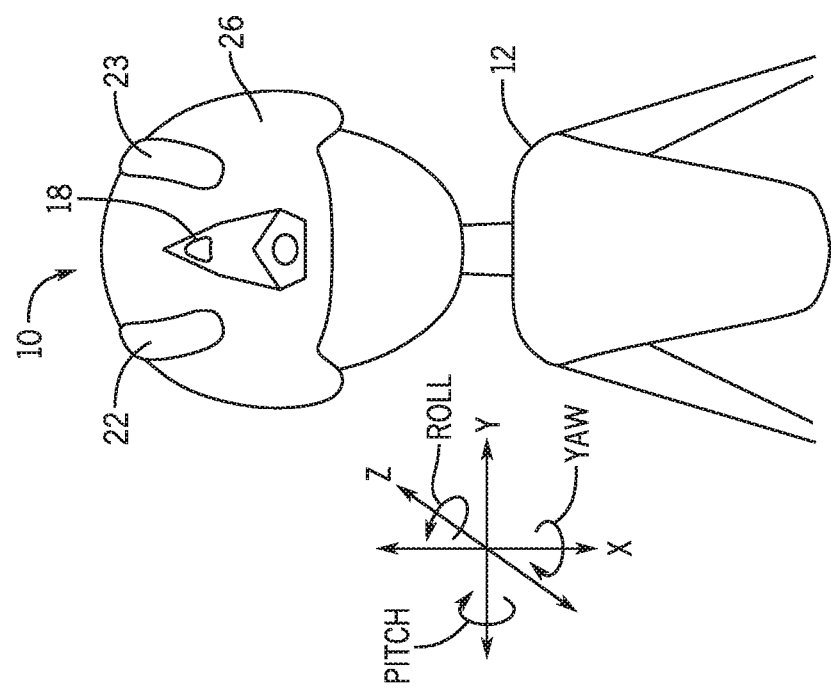
FIG. 7 is a diagram of the headgear of FIG. 1 tilted downward and a resulting output performed by actuators, according to embodiments of the present disclosure.

In some embodiments, a series of indications may be sensed by the sensors 14 and be associated with a certain output. For example, FIGS. 7 and 8 illustrate actuating both actuators 110, 112 in response the headgear 10 being tilted down and then up, according to embodiments of the present disclosure. In particular, in FIG. 7, the user 12 tilts his or her head 20 down. As such, the accelerometer 18 detects a change in pitch (e.g., about an axis parallel to the x-axis). The controller 66 may receive an indication of the change in pitch or measurements indicating the change in pitch. However, the controller 66 may determine no instruction should be sent to the actuators 110, 112 based only on the change in pitch due to the headgear 10 being tilted downward (e.g., as there are no entries in the table 82 corresponding to only this change in pitch).

In FIG. 8, the user 12 then tilts his or her head 20 upward, after tilting his or her head 20 downward in FIG. 7. In some embodiments, the user 12 tilts his or her head 20 upward within a threshold time of tilting his or her head 20 downward. As such, the accelerometer 18 detects a change in pitch (e.g., about an axis parallel to the y-axis) within a designated timeframe. The controller 66 may receive an indication of the change in roll or measurements indicating the change in roll, and determine that the actuators 110, 112 coupled to the ears 22, 23 should be actuated to extend the ears 22, 23 away from the main body 26 of the headgear 10 (as provided by the table 82). That is, the table 82 may indicate that both ears 22, 23 should be extended if there is a first indication of the user tilting his or her head 20 downward, followed by the user tilting his or her head 20 upward within a threshold period of time. As a result, the controller 66 may send an instruction to the actuators 110, 112 to actuate and extend the ears 22, 23.

Figure 11:
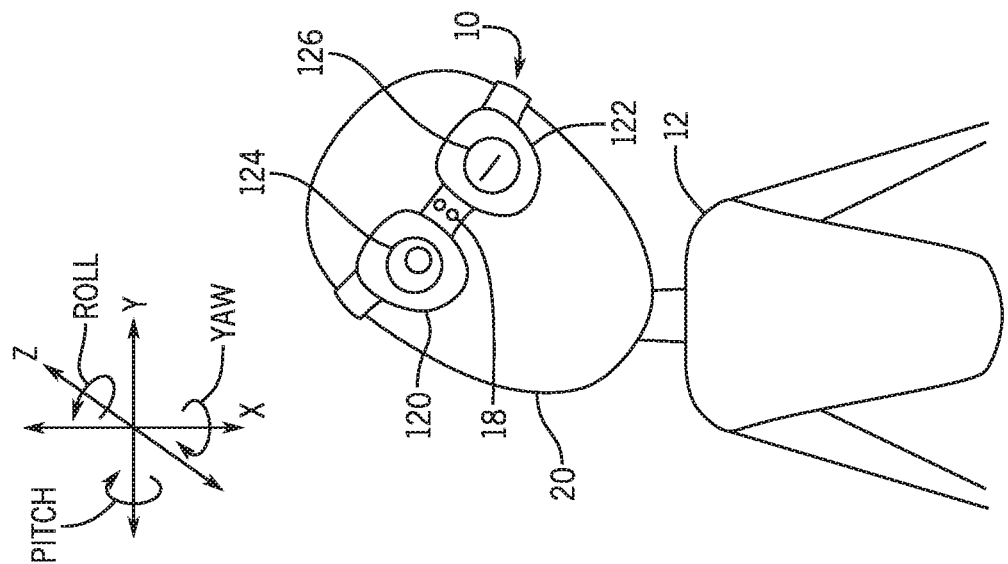
FIG. 11 is a diagram of the headgear of FIG. 2 tilted toward the left and a resulting output performed by electronic displays, according to embodiments of the present disclosure.
Figure 10:
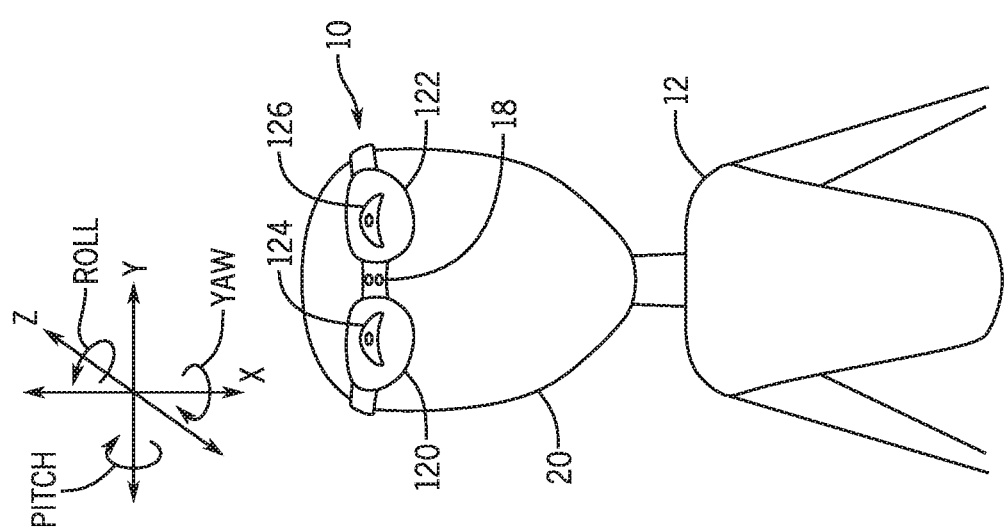
FIG. 10 is a diagram of the headgear of FIG. 2 tilted upward and a resulting output performed by electronic displays, according to embodiments of the present disclosure.
Figure 9:
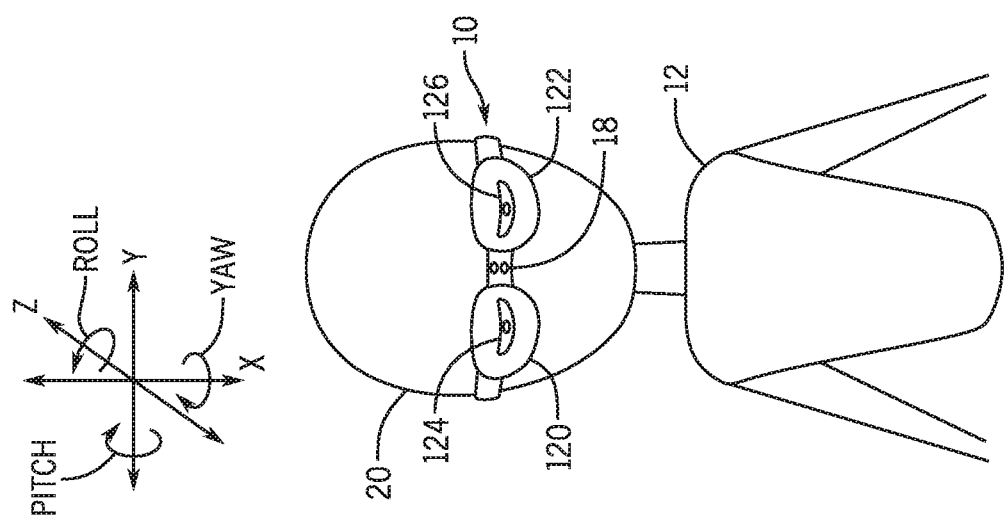
FIG. 9 is a diagram of the headgear of FIG. 2 tilted downward and a resulting output performed by electronic displays, according to embodiments of the present disclosure.

FIGS. 9-11 are diagrams of the headgear 10 in the form of goggles or glasses tilted in different orientations and resulting outputs performed by displays 120, 122, according to embodiments of the present disclosure. In particular, in FIG. 9, the user 12 tilts his or her head 20 downward. As such, the accelerometer 18 detects a change in pitch (e.g., about an axis parallel to the y-axis. The controller 66 may receive an indication of the change in pitch or measurements indicating the change in pitch, and determine that the displays 120, 122 should adjust display of the eyes 46 (e.g., as shown in FIG. 2) to instead display lidded eyes or eyes that appear to be closing or closed to simulate sleepiness (e.g., as provided by the table 82). The controller 66 may then send an instruction to the displays 120, 122 to display lidded eyes or eyes that appear to be closing or closed.

In FIG. 10, the user 12 tilts his or her head 20 upward. As such, the accelerometer 18 detects a change in pitch (e.g., about an axis parallel to the y-axis). The controller 66 may receive an indication of the change in pitch or measurements indicating the change in pitch, and determine that the displays 120, 122 should adjust display of the eyes 46 (e.g., as shown in FIG. 2) to instead display eyes that appear to be looking up (e.g., as provided by the table 82). The controller 66 may then send an instruction to the displays 120, 122 to display eyes that appear to be looking up.

In FIG. 11, the user 12 tilts his or her head 20 to the left. As such, the accelerometer 18 detects a change in roll (e.g., about an axis parallel to the z-axis or an axial direction of the headgear 10). The controller 66 may receive an indication of the change in roll or measurements indicating the change in roll, and determine that the left display 122 should adjust display of the eye 46 (e.g., as shown in FIG. 2) to instead display a closed or winking eye 126, while the right display 120 should display an open eye 124 (e.g., as provided by the table 82). The controller 66 may then send an instruction to the left display 122 to display the closed or winking eye 126 and an instruction to the right display 120 to display the open eye 124. Similarly, if the user tilts his or her head 20 to the right, the controller 66 may send an instruction to the left display 122 to display the open eye 124 and an instruction to the right display 120 to adjust display of the eye 46 (e.g., as shown in FIG. 2) to instead display the closed or winking eye 126.

FIG. 12 is a diagram of the headgear 10 in the form of a helmet within the presence of another headgear 140 and a resulting output performed by the actuators 110, 112, according to embodiments of the present disclosure. In particular, the wireless receiver 16 of the headgear 10 may receive a signal 141 from a wireless transmitter 142 of the other headgear 140. For example, the wireless transmitter 142 may periodically or continuously send an infrared or radio signal that contains identification and/or timing information of the other headgear 140. The wireless receiver 16 of the headgear 10 may receive the identification information, and the controller 66 may determine an instruction to send to an output device 40 based on the identification information. In some embodiments, different instructions may be sent to the output device 40 based on different identification information, enabling the user 12 to customize different outputs for different users wearing other headgear (e.g., headgear 140).

In some cases, the wireless receiver 16 of the headgear 10 may receive the timing information (e.g., information associated with a timestamp of when the signal 141 was sent from the wireless transmitter 142), and the controller 66 may determine a distance to the wireless transmitter 142 based on a time of receipt of the timing information by the wireless receiver 16 and the timestamp of when the signal 141 was sent. The controller 66 may then determine an instruction to send to the output device 40 based on the distance to the wireless transmitter 142 (e.g., depending on whether the distance is within a threshold distance).

In the illustrated example, upon receipt of the signal 141, the controller 66 sends an instruction to the actuators 110, 112 to "wiggle" the ears 22, 23 (e.g., causing the actuators 110, 112 to extend and retract the ears 22, 23 away from and toward the main body 26 of the headgear 10 in an alternating fashion). In particular, FIG. 12 illustrates the controller 66 causing the left actuator 112 to actuate and extend the left ear 23 (e.g., based on the table 82 mapping the identification information in the signal 141 to the instruction of wiggling the ears 22, 23). As such, the left actuator 112 is actuated and extends the left ear 23. Additionally, in response to receiving the signal indicating the presence of the other headgear 140, the controller 66 may instruct a wireless transmitter 144 of the headgear 10 to send a corresponding signal 146 to a wireless receiver 148 of the other headgear 140. The corresponding signal 146 may activate actuators 110, 112 of the other headgear 140 to wiggle its ears. In particular, FIG. 12 illustrates a left actuator 150 of the other headgear 140 actuating and extending a left ear 152 of the other headgear 140. It should be understood that instructing the actuators 110, 112, 150 to wiggle and other previously provided actuations are examples, and any suitable output or action that may be generated by the output devices 40 is contemplated.

Figure 13:
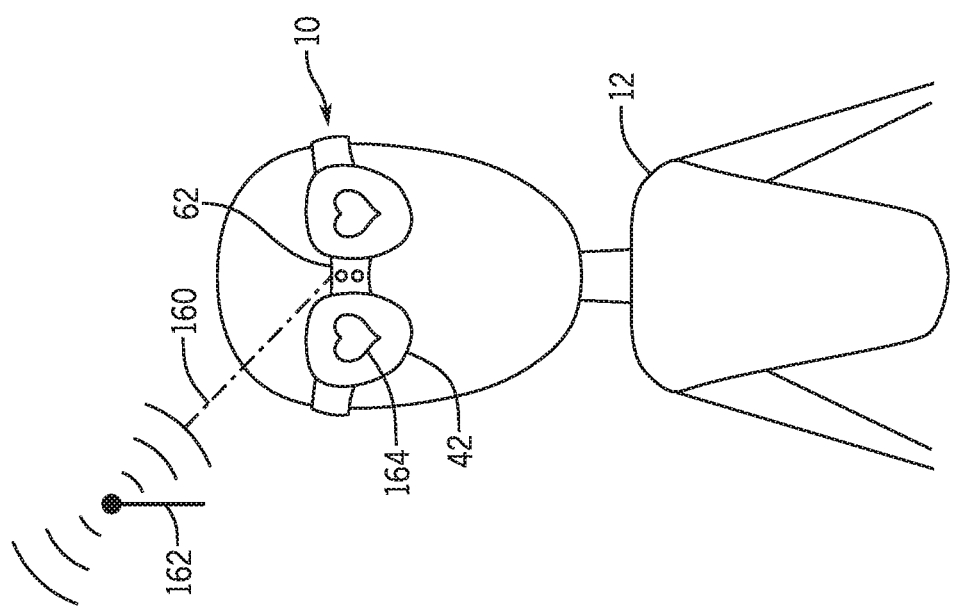
FIG. 13 is a diagram of the headgear of FIG. 2 receiving a location signal and a resulting output performed by electronic displays, according to embodiments of the present disclosure.

FIG. 13 is a diagram of the headgear 10 in the form of glasses receiving a location signal and a resulting output performed by the electronic displays 42, according to embodiments of the present disclosure. In particular, a location sensor 62 of the headgear 10 may receive one or more location signals 160 (e.g., one or more GPS signals) from a location determination system 162 (e.g., a GPS system and/or GPS satellites). As such, the controller 66 may receive an indication of the location of the headgear 10 based on the location signal 160 and determine an instruction to send to an output device 40 based on the location. For example, the user 12 may enter an area that is frequently visited or indicated as a favorite of the user 12 (e.g., an area of a theme park that is associated with the user's favorite genre of film). In the illustrated example, upon receipt of the location signal 160, the controller 66 sends an instruction to the displays 42 of the headgear 10 to display images of hearts 164 (e.g., based on the table 82 mapping the location indicated in the location signal 160 to the instruction of displaying the hearts). As such, the displays 42 display the hearts 164. It should be understood that instructing the displays 42 to display the hearts 164 is an example, and any suitable output or image that may be generated by the output devices 40 is contemplated.

Figure 14:
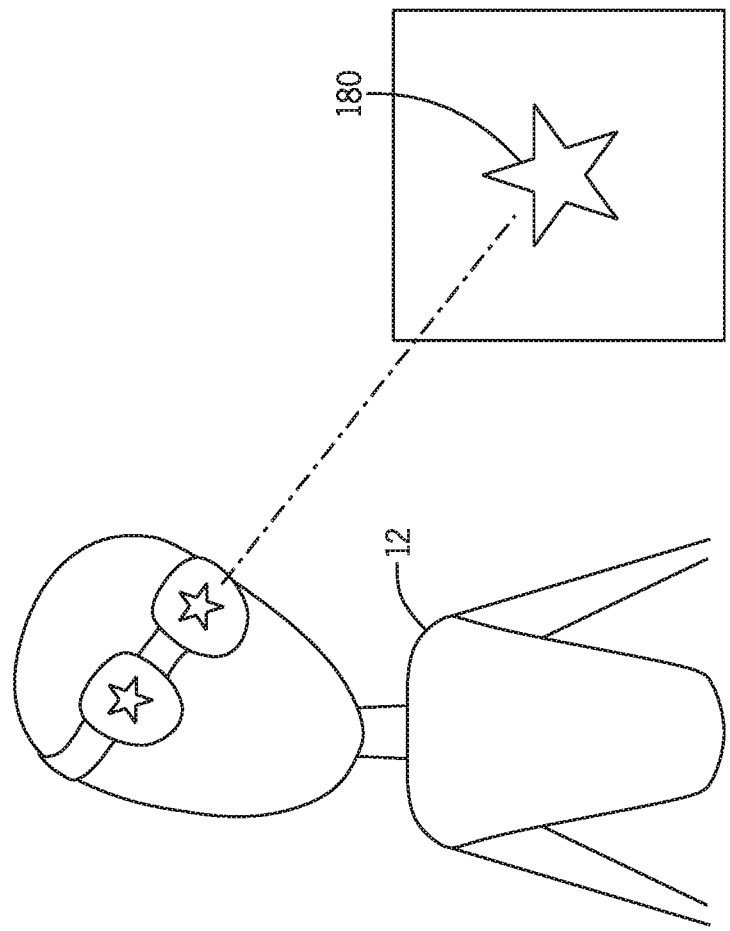
FIG. 14 is a diagram of the headgear of FIG. 2 receiving an image and a resulting output performed by electronic displays, according to embodiments of the present disclosure.

FIG. 14 is a diagram of the headgear 10 in the form of glasses receiving an image and a resulting output performed by the electronic displays 42, according to embodiments of the present disclosure. In particular, a user 12 wearing the headgear 10 may look at or view an object 180, such as a graphic, character, text, sign, poster, structure (e.g., a window frame or building), code (e.g., barcode or QR code), or the like. In FIG. 14, the object 180 is illustrated as a star. The camera 63 of the headgear 10 may be approximately aligned with the user's vision or point of view, and capture one or more images of the object 180. The controller 66 may then receive the image of the object 180, and determine an instruction to send to an output device 40 based on the image. In some cases, the processor 68 may apply image recognition processes on the image to recognize the object 180 (e.g., a face). In the illustrated example, upon receipt of the image of the object 180, the controller 66 sends an instruction to the displays 42 of the headgear 10 to display images of the object 180 (e.g., based on the table 82 mapping the object 180 to the instruction of displaying the object 180). As such, the displays 42 display the star, which can be maintained for a period of time after observing the object 180 or essentially only while observing the object 180. It should be understood that instructing the displays 42 to display the object 180 is an example, and any suitable output or image that may be generated by the output devices 40 is contemplated.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. An interactive headgear operation system comprising:
   an accelerometer coupled to headgear and configured to detect a yaw, pitch, roll, or any combination thereof of the headgear;
   a first actuator coupling a first feature of the headgear to a main body of the headgear, wherein the first actuator is configured to extend the first feature away from the main body of the headgear and retract the first feature toward the main body;

a second actuator coupling a second feature of the headgear to the main body of the headgear, wherein the second actuator s configured to extend the second feature away from the main body of the headgear and retract the second feature toward the main body; and a controller communicatively coupled to the accelerometer, the first actuator, and the second actuator, wherein the controller comprises a processor and a memory, wherein the memory is configured to store machine-readable instructions, wherein the machine-readable instructions are configured to cause the processor to:

receive an indication of the yaw, pitch, roll, or any combination thereof of the headgear from the accelerometer;

determine an instruction to send to the first actuator and the second actuator based on the indication of the yaw, pitch, roll, or any combination thereof of the headgear, wherein the instruction is configured to cause the first actuator to extend the first feature away from the main body of the headgear or retract the first feature toward the main body of the headgear, and cause the second actuator to extend the second feature away from the main body of the headgear or retract the second feature toward the main body of the headgear; and send the instruction to the first actuator and the second actuator.

2. The interactive headgear operation system of claim 1, wherein the headgear comprises a wireless receiver configured to receive a signal from a wireless transmitter of a second headgear.

3. The interactive headgear operation system of claim 2, wherein the machine-readable instructions are configured to cause the processor to:

determine a second instruction to send to the first actuator and the second actuator based on the signal, wherein the second instruction is configured to cause the first actuator to extend the first feature away from the main body of the headgear or retract the first feature toward the main body of the headgear, and cause the second actuator to extend the second feature away from the main body of the headgear or retract the second feature toward the main body of the headgear; and send the second instruction to the first actuator and the second actuator.

4. The interactive headgear operation system of claim 2, wherein the headgear comprises a second wireless transmitter, and wherein the machine-readable instructions are configured to cause the processor to send a second signal to a second wireless receiver of the second headgear in response to receiving the signal at the wireless receiver of the headgear.

5. The interactive headgear operation system of claim 1, wherein the memory is configured to store a table that maps the indication of the yaw, pitch, roll, or any combination thereof of the headgear to the instruction to send to the first actuator and the second actuator, and wherein the machine-readable instructions that are configured to cause the processor to determine the instruction to send to the first actuator and the second actuator comprise querying the table and receiving the instruction from the table.

6. The interactive headgear operation system of claim 1, wherein the headgear comprises a helmet.

7. The interactive headgear operation system of claim 1, comprising a wireless receiver configured to receive a signal from a wireless transmitter of a second headgear operation system, wherein the signal comprises identification information of the second headgear operation system, and wherein the instruction is based on the identification information.

8. The interactive headgear operation system of claim 1, wherein the machine-readable instructions are configured to cause the processor to:

send a first instruction to the first actuator and the second actuator based on a first yaw, a first pitch, a first roll, or any combination thereof of the headgear, wherein the first instruction is configured to cause the first actuator to extend the first feature away from the main body of the headgear and cause the second feature to remain retracted toward the main body;

send a second instruction to the first actuator and the second actuator based on a second yaw, a second pitch, a second roll, or any combination thereof of the headgear, wherein the second instruction is configured to cause the second actuator to extend the second feature away from the main body of the headgear and cause the first feature to remain retracted toward the main body;

send a third instruction to the first actuator and the second actuator based on a third yaw, a third pitch, a third roll, or any combination thereof of the headgear, wherein the third instruction is configured to cause both the first actuator to extend the first feature away from the main body of the headgear and the second actuator to extend the second feature away from the main body; and send a fourth instruction to the first actuator and the second actuator based on a fourth yaw, a fourth pitch, a fourth roll, or any combination thereof of the headgear, wherein the fourth instruction is configured to cause both the first actuator to retract the first feature toward the main body of the headgear and the second actuator to retract the second feature toward the main body.

9. An interactive headgear operation system comprising:

an accelerometer coupled to a headgear and configured to detect a yaw, pitch, roll, or any combination thereof of the headgear;

a plurality of electronic displays coupled to the headgear and configured to face outward from a user of the headgear, and to display eye images; and a controller communicatively coupled to the accelerometer and the plurality of electronic displays, wherein the controller comprises a processor and a memory, wherein the memory is configured to store machine-readable instructions, and wherein the machine-readable instructions are configured to cause the processor to:

receive an indication of the yaw, pitch, roll, or any combination thereof of the headgear from the accelerometer;

determine an instruction to send to the plurality of electronic displays that causes the plurality of electronic displays to adjust display of the eye images based on the indication of the yaw, pitch, roll, or any combination thereof of the headgear; and send the instruction to the plurality of electronic displays.

10. The interactive headgear operation system of claim 9, wherein the headgear comprises glasses or goggles.

11. The interactive headgear operation system of claim 9, comprising a location sensor configured to determine a location of the headgear, wherein the controller is communicatively coupled to the location sensor, and wherein the machine-readable instructions are configured to cause the processor to send a second instruction to the plurality of electronic displays to display one or more images based on the location of the headgear.

12. The interactive headgear operation system of claim 9, comprising a camera configured to capture an image, wherein the controller is communicatively coupled to the camera, and wherein the machine-readable instructions are configured to cause the processor to send a second instruction to the plurality of electronic displays to display one or more images based on image recognition information in the captured image.

13. The interactive headgear operation system of claim 12, wherein the machine-readable instructions are configured to cause the processor to apply an image recognition process to determine the image recognition information in the captured image.

14. The interactive headgear operation system of claim 9, comprising a microphone configured to capture sound or audio data, wherein the controller is communicatively coupled to the microphone, and wherein the machine-readable instructions are configured to cause the processor to send a second instruction to the plurality of electronic displays to display one or more images based on the captured sound or audio data.

15. The interactive headgear operation system of claim 9, comprising a light sensor configured to detect a presence of light, wherein the controller is communicatively coupled to the light sensor, and wherein the machine-readable instructions are configured to cause the processor to send a second instruction to the plurality of electronic displays to display one or more images based on the presence of the light.

16. The interactive headgear operation system of claim 15, wherein the light sensor is configured to detect a brightness level of the light, and wherein the machine-readable instructions are configured to cause the processor to send the second instruction to the plurality of electronic displays to display one or more images in response to determining that the brightness level of the light is above a threshold brightness level.

17. The interactive headgear operation system of claim 9, wherein the instruction causes the plurality of electronic displays to display eye images of eyes looking in a direction, winking eyes, open eyes, lidded eyes, or closed eyes based on the roll, pitch, yaw, or any combination thereof of the headgear.

18. An interactive helmet comprising:
a main body;
a wireless receiver configured to receive a signal from a wireless transmitter of a second interactive helmet, wherein the second interactive helmet periodically or continuously transmits the signal comprising identification information of the second interactive helmet;
a plurality of extending portions;
a plurality of actuators, wherein each actuator of the plurality of actuators couples a respective extending portion of the plurality of extending portions to the main body of the interactive helmet, wherein each actuator of the plurality of actuators is configured to extend the respective extending portion away from the main body of the interactive helmet or retract the respective extending portion toward the main body of the interactive helmet; and
a controller communicatively coupled to the wireless receiver and the plurality of actuators, wherein the controller comprises a processor and a memory, wherein the memory is configured to store machine-readable instructions, and wherein the machine-readable instructions are configured to cause the processor to receive the identification information of the second interactive helmet from the wireless receiver, and cause an actuator of the plurality of actuators to extend an extending portion of the plurality of extending portions away from the main body of the interactive helmet or retract the extending portion toward the main body of the interactive helmet based on the identification information.

19. The interactive helmet of claim 18, comprising a motion sensor configured to detect an orientation of the interactive helmet, wherein the machine-readable instructions are configured to cause the processor to receive an indication of the orientation of the interactive helmet from the motion sensor, and cause a first actuator to retract a first extending portion toward the main body of the interactive helmet and cause a second actuator to extend a second extending portion away from the main body of the interactive helmet based on the orientation of the interactive helmet.

20. The interactive helmet of claim 18, comprising a plurality of electronic displays, wherein the plurality of electronic displays is configured to display eyes, wherein the machine-readable instructions are configured to cause the processor to adjust display of the eyes based on an orientation of the interactive helmet.

* * * * *